(12) United States Patent
Noji (10) Patent No.: US 8,490,280 B2
(45) Date of Patent: Jul. 23, 2013

(54) WINDING DEVICE (75) Inventor: Kaoru Noji, Iino-machi (JP)

(73) Assignee: Nittoku Engineering Co., Ltd., Saitama (JP)

( * ) Notice: Subject to any disclaimer, the term of this patent is extended or adjusted under 35 U.S.C. 154(b) by 6 days.

(21) Appl. No.: 13/409,147

(22) Filed: Mar. 1, 2012

(65) Prior Publication Data

US 2012/0160950 A1 Jun. 28, 2012

Related U.S. Application Data (62) Division of application No. 12/216,879, filed on Jul. 11, 2008, now Pat. No. 8,146,238.

(30) Foreign Application Priority Data

Jul. 13, 2007 (JP) ................................. 2007-184342

(51) Int. Cl.
*H02K 15/085* (2006.01)

(52) U.S. Cl.
USPC ............................. 29/732; 29/596; 242/432.2

(58) Field of Classification Search
USPC ........................................................... 29/732
See application file for complete search history.

(56) References Cited

U.S. PATENT DOCUMENTS 6,685,127 B2 * 2/2004 Takano et al. .............. 242/432.2

FOREIGN PATENT DOCUMENTS

| CN | 1326256 A | 12/2001 |
|---|---|---|
| CN | 1756048 A | 4/2006 |
| JP | 2002-112512 | 4/2002 |
| JP | 2002-199673 | 7/2002 |
| JP | 2003-164123 | 6/2003 |
| JP | 2005-318695 | 11/2005 |
| JP | 2006-81372 | 3/2006 |
| WO | WO-2004/032311 | 4/2004 |

* cited by examiner

*Primary Examiner* — Livius R Cazan
(74) *Attorney, Agent, or Firm* — Rabin & Berdo, P.C.

(57) ABSTRACT

A winding device that winds a wire fed from a wire feeding member onto a stator having a plurality of radially disposed magnetic poles, includes a wire feeding member moving mechanism that moves the wire feeding member relative to the stator. The device also has a guide that holds the wire fed from the wire feeding member and positions the wire relative to a magnetic pole. The wire feeding member is moved relative to the stator without being passed between adjacent magnetic poles while the wire is held by the guide such that the wire fed from the wire feeding member is inserted between the adjacent magnetic poles.

4 Claims, 9 Drawing Sheets

WINDING DEVICE

This is a Divisional of U.S. application Ser. No. 12/216,879, filed on Jul. 11, 2008 now U.S. Pat. No. 8,146,238, and allowed on Feb. 9, 2012, the subject matter of which is incorporated herein by reference.

TECHNICAL FIELD OF THE INVENTION

This invention relates to a winding method and a winding device for winding a wire around a magnetic pole of a stator.

DESCRIPTION OF RELATED ART

Methods of winding a wire around a magnetic pole of a stator include a direct winding method, in which the wire is wound directly around the magnetic pole, and an insert method, in which the wire is first wound around a winding frame or the like, after which a wound coil is fitted onto the magnetic pole.

With the direct winding method, the wire can be wound tightly around the magnetic pole and regular winding can be performed easily by moving a nozzle, enabling an improvement in the space factor. Hence, due to demand for improvements in the performance of motors and so on, the direct winding method has become prevalent in recent years.

When two-phase winding is performed in relation to the magnetic poles of a stator using the direct winding method, the first phase is wound around every other magnetic pole of the stator, and the second phase is wound around the magnetic poles on which winding has not been performed, between the magnetic poles around which the first phase is wound.

In the direct winding method, winding is performed by moving the nozzle through a slot between adjacent magnetic poles, and therefore, when a gap between opposing wires (a gap between the first phase and second phase) within the slot becomes smaller than the width of the nozzle during second phase winding, winding can no longer be performed.

In a typical method employed in the prior art when the gap between adjacent magnetic poles is too small for the nozzle to pass between the magnetic poles, winding is performed by drawing out a wire from the nozzle using a hook, guiding the drawn wire between the magnetic poles, detaching the wire from the hook, and then dropping the wire onto the magnetic pole (see International Patent Application Pamphlet No. 2004/032311 and JP2002-199673A).

SUMMARY OF THE INVENTION

With this method, however, the dropped wire easily becomes loose, making regular winding difficult, and as a result, irregular winding may occur such that the space factor cannot be improved.

Hence, in a method for improving the space factor without using a hook, the stator is provided as a divided core, winding is performed in advance on each core, and then the cores on which the wire is wound are fixed to a yoke. With this method, however, post-processing such as a core inserting step and a wire connecting step must be performed following winding, and therefore the production efficiency is poor.

This invention has been designed in consideration of the problems described above, and it is an object thereof to provide a winding method and a winding device with which a wire can be wound regularly in a gap between adjacent magnetic poles, even when the gap is small, and with which post-processing following winding is not required.

In order to achieve above object, this invention provides a winding method for winding a wire fed from a wire feeding member onto a stator having a plurality of radially disposed magnetic poles. The winding method comprises a positioning step for positioning the wire fed from the wire feeding member relative to a magnetic pole while holding the wire using a guide, and a wire inserting step for moving the wire feeding member relative to the stator without passing the wire feeding member between adjacent magnetic poles while the wire is held by the guide such that the wire fed from the wire feeding member is inserted between the adjacent magnetic poles, wherein the wire is guided to and wound around the magnetic pole by the positioning step and the wire inserting step.

PREFERRED EMBODIMENTS OF THE INVENTION

Embodiments of this invention will be described below with reference to the figures.

First Embodiment

Figure 1:
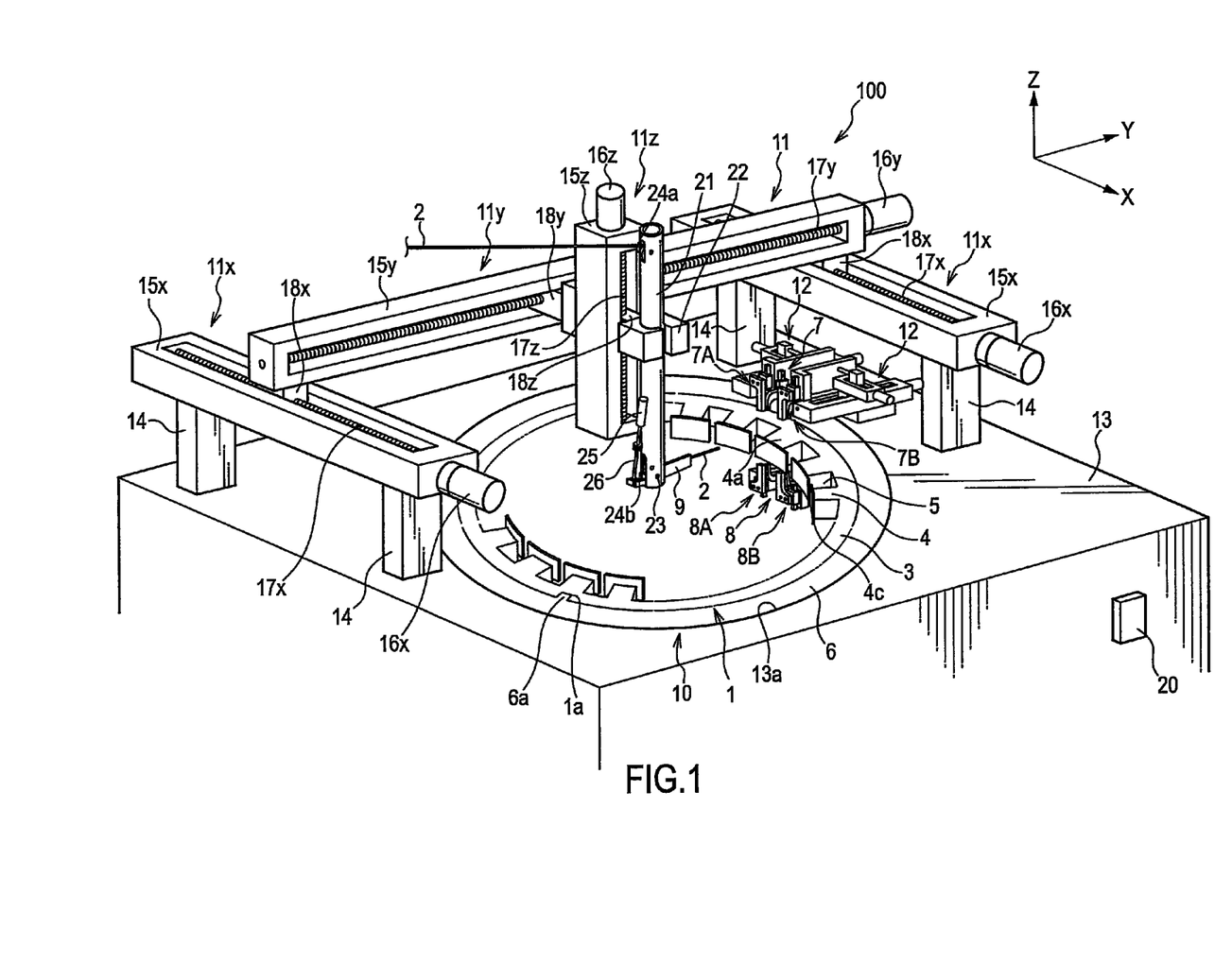
FIG. 1 is a perspective view showing a winding device according to a first embodiment of this invention.
Figure 2:
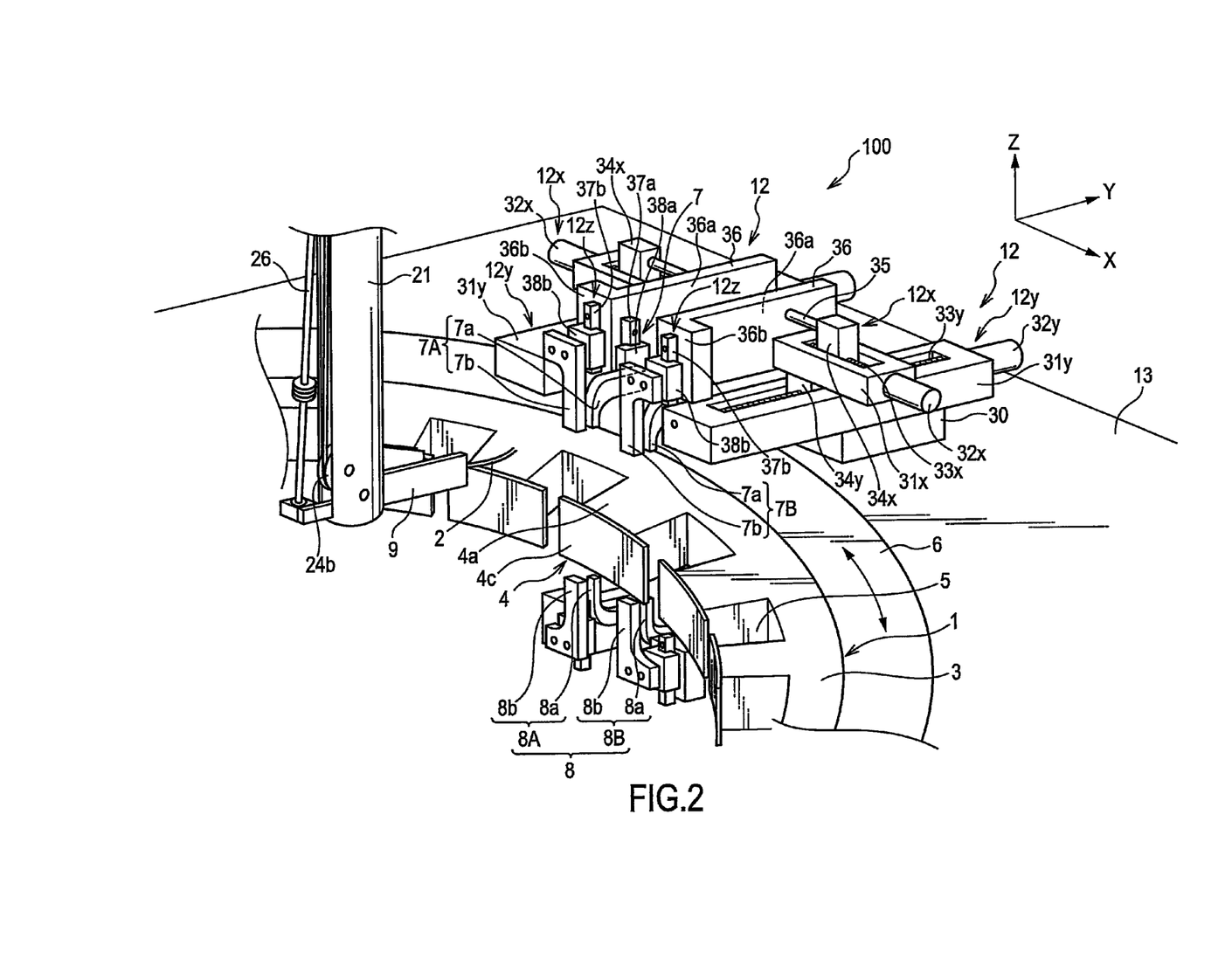
FIG. 2 is an enlarged perspective view showing the main parts of the winding device according to the first embodiment of this invention.

First, referring to FIGS. 1 and 2, the constitution of a winding device 100 according to a first embodiment of this invention will be described. FIG. 1 is a perspective view showing the winding device 100, and FIG. 2 is an enlarged perspective view showing the main parts of the winding device 100.

In the following description, three orthogonal axes, namely X, Y and Z, are set, wherein the X axis extends in a substantially horizontal front-rear direction, the Y axis extends in a substantially horizontal lateral direction, and the Z axis extends in a substantially vertical direction.

The winding device 100 is a device which winds a wire 2 automatically onto a stator 1.

The stator 1 is an inner stator comprising a ring-shaped yoke 3 and teeth 4 (magnetic poles) disposed on an inner periphery of the yoke 3 so as to extend radially toward the center of the stator 1. The wire 2 is wound around each tooth 4 by the winding device 100 such that a winding is accommodated in a slot 5 formed between adjacent teeth 4.

In this embodiment, the teeth 4 are formed with a square cross-section, and the slot 5 is constituted by opposing side faces of the adjacent teeth 4 and an inner peripheral surface of the yoke 3. Further, a collar portion 4c is provided on a tip end surface of each tooth 4, and the collar portion 4c limits the winding width of the coil wound around the tooth 4.

The winding device 100 comprises an index mechanism 10 that rotates the stator 1 about a central axis thereof, a nozzle 9 serving as a wire feeding member that feeds the wire 2, and a nozzle moving mechanism 11 serving as a wire feeding member moving mechanism that moves the nozzle 9 in the direction of the three orthogonal axes. The winding device 100 is carried on a base 13.

The index mechanism 10 comprises a support base 6 that supports the stator 1 horizontally, and a driving mechanism (not shown) that drives the support base 6 to rotate. The stator 1 is supported on an inner periphery of the support base 6 by fitting a key 6a formed on the inner periphery of the support base 6 into a key groove 1a formed on an outer periphery of the stator 1.

The support base 6 is disposed to be free to rotate around an inner periphery of a circular opening portion 13a formed in the base 13 via a bearing (not shown).

Hence, when the support base 6 is driven to rotate by the driving mechanism, the stator 1 supported by the support base 6 rotates about the axial center.

The nozzle moving mechanism 11 comprises a pair of X axis moving mechanisms 11x extending in the X axis direction, which are supported on support posts 14 standing upright on the base 13, a Y axis moving mechanism 11y extending in the Y axis direction, which straddles and is connected to the pair of X axis moving mechanisms 11x, and a Z axis moving mechanism 11z extending in the Z axis direction, which is connected to the Y axis moving mechanism 11y.

The X axis moving mechanism 11x comprises a pair of casings 15x supported on the support posts 14, a drive motor 16x disposed on an end portion of the casing 15x, a ball screw 17x extending in the X axis direction, which is connected to an output shaft of the drive motor 16x, and a follower 18x screwed to the ball screw 17x so as to move along the ball screw 17x.

The Y axis moving mechanism 11y comprises a casing 15y, the two end portions of which are coupled to the pair of followers 18x of the X axis moving mechanism 11x, and which moves along the ball screws 17x, a drive motor 16y disposed on an end portion of the casing 15y, a ball screw 17y extending in the Y axis direction, which is connected to an output shaft of the drive motor 16y, and a follower 18y screwed to the ball screw 17y so as to move along the ball screw 17y.

The Z axis moving mechanism 11z comprises a casing 15z that is coupled to the follower 18y of the Y axis moving mechanism 11y and moves along the ball screw 17y, a drive motor 16z disposed on an end portion of the casing 15z, a ball screw 17z extending in the Z axis direction, which is connected to an output shaft of the drive motor 16z, and a follower 18z screwed to the ball screw 17z so as to move along the ball screw 17z.

A cylindrical nozzle holding member 21 extending in the Z axis direction is connected to the follower 18z of the Z axis moving mechanism 11z via a support member 22.

A nozzle 9 is attached to an end portion of the nozzle holding member 21 so as to be capable of oscillating about a shaft 23. Therefore, by driving the X axis moving mechanisms 11x, the Y axis moving mechanism 11y, and the Z axis moving mechanism 11z, the nozzle 9 can be moved freely in the three orthogonal axis directions.

A first pulley 24a and a second pulley 24b that rotate about their respective axial centers are provided on either end portion of the nozzle holding member 21. The wire 2, which is supplied from a wire supply device (not shown), is guided by the first pulley 24a so as to be led into a hollow portion of the nozzle holding member 21, guided by the second pulley 24b so as to be led to the nozzle 9, and then fed from a tip end portion of the nozzle 9. A predetermined tension is applied to the wire 2 supplied from the wire supply device by a tension device (not shown).

An air cylinder 25 is disposed on an outer peripheral surface of the nozzle holding member 21. A piston rod 26 that is caused to advance and retreat by compressed air is inserted into the air cylinder 25. A tip end portion of the piston rod 26 is connected to a rear end portion of the nozzle 9.

Hence, when the air cylinder 25 is driven, the nozzle 9 oscillates about the shaft 23. By controlling an operation of the air cylinder 25 in this manner, the orientation of the nozzle 9 can be varied, whereby the angle of the wire 2 fed from the nozzle 9 can be adjusted.

The nozzle 9 is a member which is formed in flat plate form so as to be capable of passing through the slots 5 between the teeth 4, and the wire 2 penetrates the nozzle 9 in the Y axis direction.

When the wire 2 is wound around the tooth 4, the stator 1 is rotated by the index mechanism 10 such that the desired tooth 4 to be subjected to winding faces the nozzle 9. In other words, the tooth 4 to be subjected to winding is disposed coaxially with the nozzle 9 (on the Y axis). Hereafter, the tooth that is disposed coaxially with the nozzle 9 in order to be subjected to winding will be referred to as the "winding subject tooth".

When, with a tip end portion of the fed wire 2 held by a chuck (not shown), the nozzle moving mechanism 11 is driven such that the nozzle 9 orbits the tooth 4 and moves in a winding axis direction (the Y axis direction) of the tooth 4 while feeding out the wire 2. As a result, the wire 2 is wound around the tooth 4 in a multilayer, regular form.

More specifically, by driving the X axis moving mechanism 11x and Z axis moving mechanism 11z, the nozzle 9 is caused to orbit the tooth 4. Further, by driving the Y axis moving mechanism 11y every time the nozzle 9 completes a single orbit of the tooth 4, the nozzle 9 is moved in the winding axis direction of the tooth 4 by an amount corresponding to the diameter of the wire 2. By repeating this operation, a first layer of the wire 2 is wound regularly around the tooth 4 from a tip end side to a root side thereof. Next, a second layer of the wire 2 is wound regularly from the root side to the tip end side, whereupon the wire 2 is wound regularly in a similar manner so as to form a predetermined number of layers in sequence.

Winding is performed on the teeth 4 in UV two-phase form, UVW three-phase form, and so on. When winding is performed in UV two-phase form, for example, first the U-phase is wound sequentially around every other tooth 4 of the stator 1. Next, V-phase winding is performed on the teeth 4 that have not been subjected to winding, i.e. the teeth between the teeth 4 around which the U-phase is wound. Thus, V-phase winding is performed when the U-phase has already been wound around the teeth 4 on other side of the winding subject tooth 4. Therefore, when V-phase winding is performed by causing the nozzle 9 to orbit the teeth 4, the number of layers increases such that gradually, the gap between the wires 2 wound around the teeth 4, or in other words the width of the slot 5, decreases.

When UVW three-phase winding is performed, first the U-phase is wound sequentially around every third tooth 4 of the stator 1. Next, V-phase winding is performed in a state where the U-phase is wound on one side of the winding subject tooth 4. Finally, W-phase winding is performed in a state where the U-phase is wound on one side of the winding subject tooth 4 and V-phase is wound on the other side of the winding subject tooth 4. Therefore, when V-phase winding and W-phase winding are performed by causing the nozzle 9 to orbit the teeth 4, the number of layers increases such that the width of the slot 5 gradually decreases.

When the width of the slot 5 is small, it is difficult for the nozzle 9 to move within the slot 5 (to move in the Z axis direction). When the width of the slot 5 becomes smaller than the width of the nozzle 9, it becomes impossible for the nozzle 9 to move within the slot 5. However, even in such a case, it is possible to insert the wire 2 alone into the slot 5 as long as the width of the slot 5 is greater than the diameter of the wire 2.

Hence, the winding device 100 comprises a mechanism for winding the wire 2 around the teeth 4 even when the gap between the wires 2 wound around the teeth 4 is small. This mechanism will be described below.

The winding device 100 comprises an upper portion guide 7 and a lower portion guide 8 that hold the wire 2 fed from the nozzle 9 and position the held wire 2 relative to the winding subject tooth 4 during the winding process onto the tooth 4.

The upper portion guide 7 is disposed facing a front surface 4a (non-opposing surface) of the outer peripheral surface of the winding subject tooth 4 that does not oppose the adjacent teeth 4, while the lower portion guide 8 is disposed facing a rear surface 4b (non-opposing surface) on the opposite side of the front surface 4a.

As shown in FIG. 2, the upper portion guide 7 is constituted by an upper portion left guide 7A and an upper portion right guide 7B disposed in alignment with the winding direction (X axis direction) of the wire 2. Further, the upper portion left guide 7A and the upper portion right guide 7B respectively comprise a first guide 7a, which is disposed parallel with the winding direction (X axis direction) of the wire 2 to be wound around the winding subject tooth 4, and a second guide 7b, which is disposed parallel with the first guide 7a with a gap equivalent to the diameter of the wire 2 therebetween.

Similarly, the lower portion guide 8 is constituted by a lower portion left guide 8A and a lower portion right guide 8B disposed in alignment with the winding direction (X axis direction) of the wire 2, and the lower portion left guide 8A and lower portion right guide 8B respectively comprise a first guide 8a and a second guide 8b.

A pair of guide moving mechanisms 12 that move the upper portion left guide 7A and upper portion right guide 7B in each of the three orthogonal axis directions is disposed on the base 13.

The guide moving mechanism 12 comprises a winding axis direction moving mechanism 12y that moves the upper portion guide 7 in the winding axis direction (the Y axis direction) of the winding subject tooth 4, a winding direction moving mechanism 12x that moves the upper portion guide 7 in the winding direction (the X axis direction) of the wire 2 to be wound around the winding subject tooth 4, and a vertical direction moving mechanism 12z that moves the upper portion guide 7 in an approach/withdrawal direction (the Z axis direction) relative to the winding subject tooth 4.

The winding axis direction moving mechanism 12y comprises a casing 31y supported on a carrying stand 30 placed on the base 13, a drive motor 32y disposed on an end portion of the casing 31y, a ball screw 33y connected to an output shaft of the drive motor 32y so as to extend in the Y axis direction, and a follower 34y screwed to the ball screw 33y so as to move along the ball screw 33y.

The winding direction moving mechanism 12x comprises a casing 31x coupled to the follower 34y of the winding axis direction moving mechanism 12y so as to move along the ball screw 33y, a drive motor 32x disposed on an end portion of the casing 31x, a ball screw 33x connected to an output shaft of the drive motor 32x so as to extend in the X axis direction, and a follower 34x screwed to the ball screw 33x so as to move along the ball screw 33x.

A rod 35 that extends in the X axis direction is coupled to the follower 34x of the winding direction moving mechanism 12x, and an L-shaped support 36 is coupled to a tip end of the rod 35. The vertical direction moving mechanism 12z is disposed on a surface 36a and a surface 36b of the support 36, which are orthogonal to the X axis direction and the Y axis direction, respectively.

The vertical direction moving mechanism 12z comprises guide rails 37a, 37b disposed on the respective surfaces 36a, 36b of the support 36 so as to extend in the Z axis direction, and movable bodies 38a, 38b which are guided by the guide rails 37a, 37b so as to be capable of moving along the guide rails 37a, 37b.

An air cylinder (not shown) is housed in the support 36. A piston that is caused to advance and retreat by compressed air is inserted into the air cylinder, and the piston is connected to the movable bodies 38a, 38b. Hence, when the air cylinder is driven, the movable bodies 38a, 38b move along the guide rails 37a, 37b.

The first guide 7a is coupled to the movable body 38a, and the second guide 7b is coupled to the movable body 38b. Hence, by driving the winding axis direction moving mechanism 12y, the winding direction moving mechanism 12x, and the vertical direction moving mechanism 12z, the first guide 7a and second guide 7b can move freely in the three orthogonal axis directions relative to the front surface 4a of the winding subject tooth 4. Further, the guide moving mechanism 12 is provided individually for each of the upper portion left guide 7A and the upper portion right guide 7B, and therefore the upper portion left guide 7A and upper portion right guide 7B can move freely and individually in the three orthogonal axis directions relative to the front surface 4a of the winding subject tooth 4.

The guide moving mechanism 12 is also provided individually for each of the lower portion left guide 8A and the lower portion right guide 8B of the lower portion guide 8.

Figure 3A:
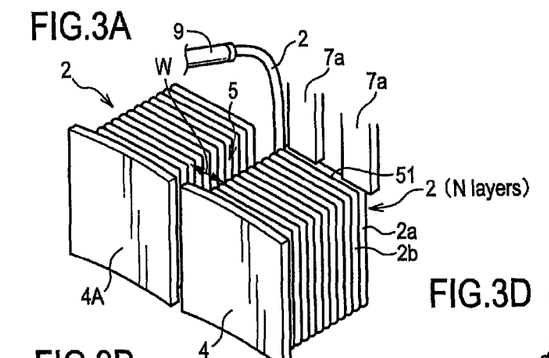
FIGS. 3A to 3E are views showing a winding method in chronological order.

Next, referring principally to FIGS. 3 and 4, a method of winding the wire 2 around the teeth 4 using the upper portion guide 7 and lower portion guide 8 will be described. FIGS. 3 and 4 are views showing the chronological order of a winding operation. The operation of the winding device 100 to be described below is controlled automatically by a controller 20 shown in FIG. 1.

First, as described above, the stator 1 is rotated by the index mechanism 10 to cause the nozzle 9 to face the winding subject tooth 4. The nozzle 9 is then caused to orbit the winding subject tooth 4 by driving the nozzle moving mechanism 11, whereby the wire 2 fed from the nozzle 9 is wound regularly around the winding subject tooth 4. In other words, winding is performed by causing the nozzle 9 to pass through the slot 5.

As the number of layers of the wire 2 wound around the winding subject tooth 4 increases, the gap between the wire 2 wound around the winding subject tooth 4 and the wire 2 wound around adjacent teeth 4A, 4B, or in other words a width W of the slot 5, decreases. When the width W of the slot 5 falls below the width of the nozzle 9, the nozzle 9 becomes unable to move through the slot 5.

Even in this case, however, the wire 2 can be inserted into the slot 5 as long as the width W of the slot 5 is greater than the diameter of the wire 2, and therefore winding can be continued. A winding method employed in a case where the width W of the slot 5 is smaller than the width of the nozzle 9 will be described below.

FIG. 3A shows a state in which the width W of the slot 5 has become smaller than the width of the nozzle 9 after winding N layers (where N in a natural number) of the wire 2 around the winding subject tooth 4, and in which an N+1$^{th}$ layer is about to be wound around the winding subject tooth 4. A case in which the wire 2 is wound in a groove 51 between a wire 2a on an end portion of the N$^{th}$ layer and an adjacent wire 2b thereto will be described below.

First, as shown in FIG. 3A, the guide moving mechanism 12 is driven to begin winding the N+1$^{th}$ layer, whereby the pair of first guides 7a of the upper portion guide 7 are caused to approach the winding subject tooth 4 until they are disposed parallel to the winding direction of the wire 2 (the X axis direction).

Figure 3B:
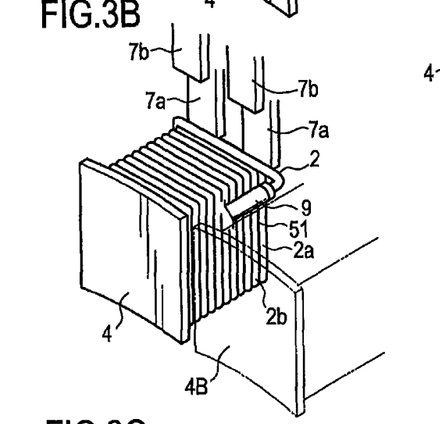
Figure 4A:
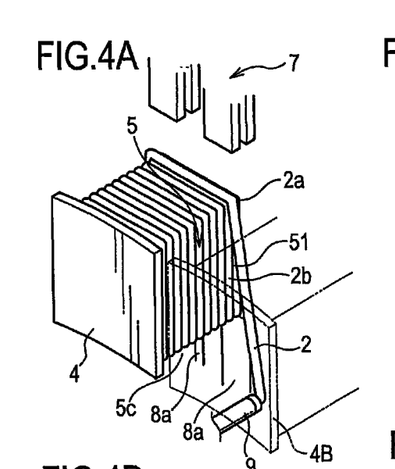
FIGS. 4A to 4F are views showing the winding method in chronological order.
Figures 4B, 4C, 4E, 4F:
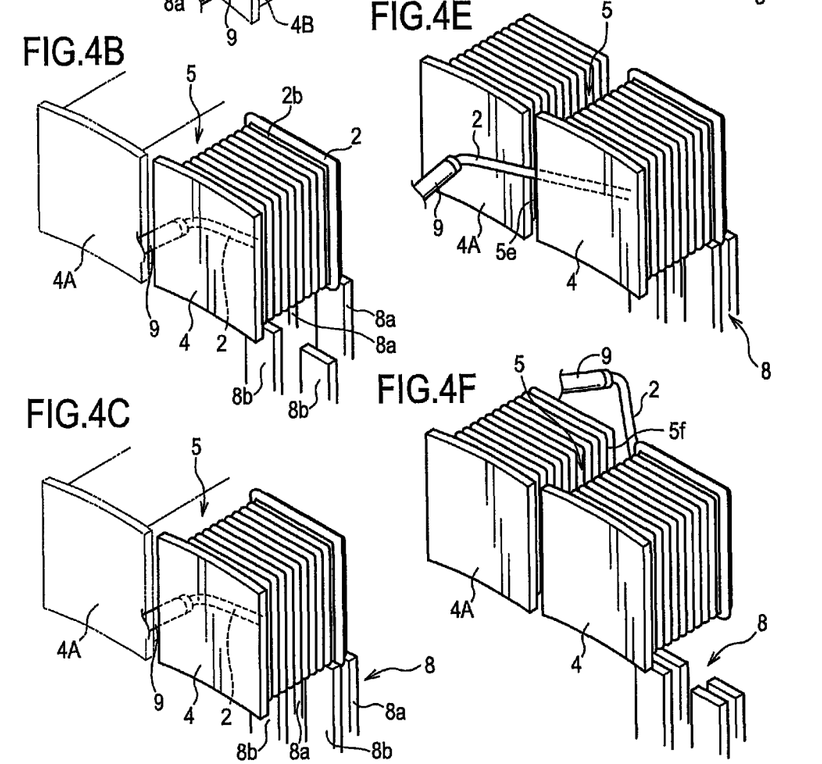
Figure 4D:
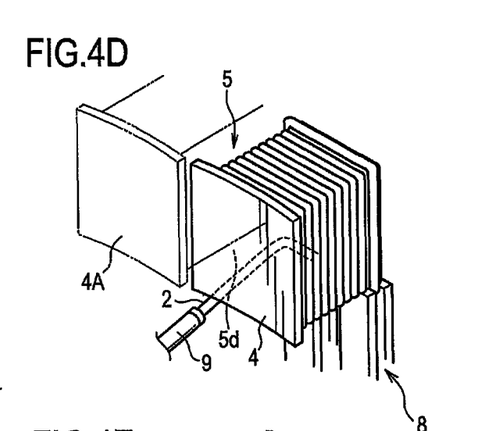

Next, as shown in FIG. 3B, the nozzle 9 positioned on the outside of the slot 5 is moved in the X axis direction over the front surface 4a of the winding subject tooth 4 by driving the nozzle moving mechanism 11 such that the wire 2 fed from the nozzle 9 comes into contact with the front surface of the pair of first guides 7a. As a result, the wire 2 fed from the nozzle 9 is guided onto the N$^{th}$ layer on the front surface 4a of the winding subject tooth 4.

Figure 3C:
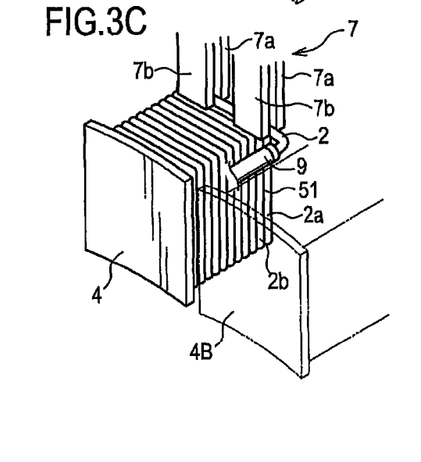

Next, as shown in FIG. 3C, the pair of second guides 7b of the upper portion guide 7 are caused to approach the winding subject tooth 4 by driving the guide moving mechanism 12. The gap between the opposing surfaces of the pair of first guides 7a and the pair of second guides 7b corresponds to the diameter of the wire 2, and therefore the wire 2 fed from the nozzle 9 is gripped and held between the opposing surfaces of the pair of first guides 7a and the pair of second guides 7b. Further, the upper portion guide 7 positions the held wire 2 in a position facing the groove 51 between the wire 2a and the wire 2b of the N$^{th}$ layer on the front surface 4a of the winding subject tooth 4. Thus, the upper portion guide 7 holds the wire 2 and positions the held wire 2 relative to the winding subject tooth 4 (positioning step).

Hereafter, the position in which the wire 2 is to be wound when winding the wire 2 around the winding subject tooth 4 will be referred to as a "winding position". In the winding method shown in FIGS. 3 and 4, the groove 51 between the wires of the N$^{th}$ layer is the "winding position".

Figure 3D:
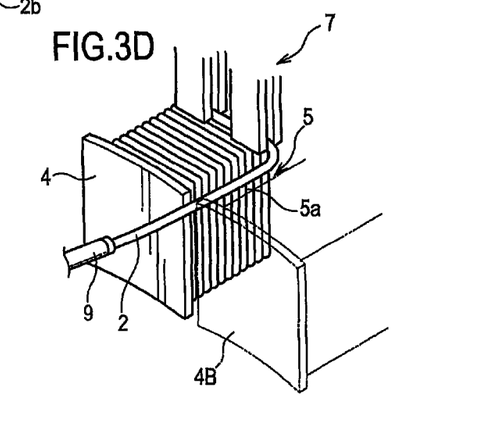

Next, as shown in FIG. 3D, the nozzle 9 positioned on the outside of the slot 5 is moved in the winding axis direction (the Y axis direction) of the winding subject tooth 4 along an opening portion 5a in the slot 5 that opens onto a front surface of the stator 1 by moving the nozzle moving mechanism 11, whereby the nozzle 9 moves away from the winding subject tooth 4. At this time, the upper portion guide 7 maintains the wire 2 in a held state, and therefore the wire 2 held by the upper portion guide 7 remains positioned in the winding position.

Figure 3E:
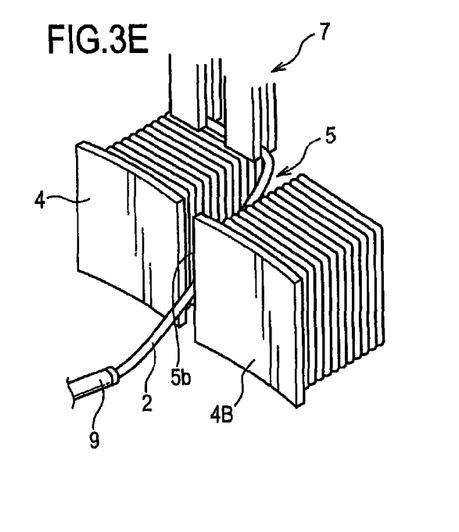

Next, as shown in FIG. 3E, the nozzle 9 positioned on the outside of the slot 5 is moved in an axial direction of the stator 1 (the Z axis direction) along an opening portion 5b in the slot 5 that opens onto an inner periphery of the stator 1 by driving the nozzle moving mechanism 11, whereby the wire 2 fed from the nozzle 9 is inserted into the slot 5. Thus, the nozzle 9 is operated so as to insert the fed wire 2 into the slot 5 without passing through the slot 5 (wire inserting step). At this time, the upper portion guide 7 continues to hold the wire 2, and therefore the wire 2 held by the upper portion guide 7 remains positioned in the winding position.

Next, as shown in FIG. 4A, the nozzle 9 positioned on the outside of the slot 5 is moved in the winding axis direction (the Y axis direction) of the winding subject tooth 4 along an opening portion 5c in the slot 5 that opens onto a rear surface of the stator 1 by driving the nozzle moving mechanism 11. When the fed wire 2 faces the groove 51 between the wire 2a and the wire 2b of the N$^{th}$ layer on one side face of the winding subject tooth 4 (the surface facing the tooth 4B), the nozzle 9 is stopped.

Thus, while the wire 2 is held by the upper portion guide 7, the nozzle 9 is moved along the opening portions 5a, 5b, 5c of the slot 5 on the outside of the slot 5 such that the fed wire 2 is inserted into the slot 5, and as a result, the wire 2 fed from the nozzle 9 can be led to the winding position on one side face of the winding subject tooth 4. Therefore, the wire 2 can be wound around the winding subject tooth 4 even when the nozzle 9 cannot pass through the slot 5.

Once the wire 2 fed from the nozzle 9 has been led to the winding position on one side face of the winding subject tooth 4, the upper portion guide 7 is withdrawn from the winding subject tooth 4, as shown in FIG. 4A, such that the hold of the upper portion guide 7 on the wire 2 is released. At the same time, the pair of first guides 8a of the lower portion guide 8 are caused to approach the winding subject tooth 4 until they are disposed parallel to the winding direction of the wire 2 (the X axis direction).

Next, as shown in FIG. 4B, the nozzle 9 positioned on the outside of the slot 5 is moved in the X axis direction along the rear surface 4b of the winding subject tooth 4 by driving the nozzle moving mechanism 11 such that the wire 2 fed from the nozzle 9 comes into contact with the front surface of the pair of first guides 8a. As a result, the wire 2 fed from the nozzle 9 is guided onto the N$^{th}$ layer on the rear surface 4b of the winding subject tooth 4. Also at this time, the wire 2 released from the hold of the upper portion guide 7 is wound in the winding position of the N$^{th}$ layer on the front surface 4a of the winding subject tooth 4, and the wire inserted into the slot 5 is wound in the winding position of the N$^{th}$ layer on one side face of the winding subject tooth 4. It should be noted that the nozzle 9 may be moved in the X axis direction by driving the index mechanism 10 such that the stator 1 is rotated about its axial center.

Next, as shown in FIG. 4C, the pair of second guides 8b of the lower portion guide 8 are caused to approach the winding subject tooth 4 by driving the guide moving mechanism 12. As a result, the wire 2 fed from the nozzle 9 is gripped and held between the opposing surfaces of the pair of first guides 8a and the pair of second guides 8b, and positioned in a position facing the winding position on the rear surface 4b of the winding subject tooth 4.

Next, as shown in FIGS. 4D to 4F, the nozzle 9 is moved along respective opening portions 5d, 5e, 5f of the slot 5 on the outside of the slot 5 while the wire 2 remains held by the lower portion guide 8, whereby the fed wire 2 is inserted into the slot 5. As a result, the wire 2 fed from the nozzle 9 is led to the winding position on the other side face (the surface facing the tooth 4A) of the winding subject tooth 4. Then, as shown in FIG. 4F, the lower portion guide 8 is withdrawn from the winding subject tooth 4 such that the hold of the lower portion guide 8 on the wire 2 is released.

Thereafter, every time the wire 2 is wound once around the winding subject tooth 4, the nozzle 9 is moved in the winding axis direction of the winding subject tooth 4 (the Y axis direction) by an amount corresponding to the diameter of the wire 2, and the upper portion guide 7 and lower portion guide 8 are also moved in the Y axis direction by an amount corresponding to the diameter of the wire 2. By repeating the procedures described above, the N+1$^{th}$ layer is wound.

By causing the nozzle 9 to orbit the winding subject tooth 4 in the manner described above, the N+1$^{th}$ layer is wound regularly onto the N$^{th}$ layer.

After the N+1$^{th}$ layer, winding continues until the width W of the slot 5 becomes smaller than the diameter of the wire 2.

A method of winding the wire 2 onto the winding subject tooth 4 by causing the nozzle 9 to orbit the winding subject tooth 4 and shifting to a winding method employing the upper portion guide 7 and lower portion guide 8 when the width W of the slot 5 falls below the width of the nozzle 9 was described above. This shift in the winding method is performed when the controller 20 determines during winding that the width W of the slot 5, which is constantly measured by a sensor (detector), has become smaller than the width of the nozzle 9 on the basis of a comparison between the measurement result and the width of the nozzle 9.

Alternatively, values of the gap between the winding subject tooth 4 and the adjacent teeth 4A, 4B, the width dimension of the nozzle 9, and the diameter of the wire 2 may be input into the controller 20 before winding begins, and from these values, the controller 20 may calculate the number of layers of the wire 2 at which the width W of the slot 5 becomes smaller than the width of the nozzle 9 such that when the number of layers of the wire 2 wound around the winding subject tooth 4 reaches the calculated value, the winding method is shifted to the winding method employing the upper portion guide 7 and the lower portion guide 8.

Other aspects of the winding method described with reference to FIGS. 3 and 4 will be described below.

(1) In a case where winding is performed onto a stator 1 in which the gap between adjacent teeth 4 is smaller than the width of the nozzle 9 even when the wire 2 is not wound, winding is performed using the upper portion guide 7 and lower portion guide 8 from the 1$^{st}$ layer.

(2) In the winding method described above, the nozzle 9 is moved along the opening portions 5a, 5b, 5c (the opening portions 5d, 5e, 5f) of the slot 5 on the outside of the slot 5 such that the fed wire 2 is inserted into the slot 5 when the nozzle 9 is incapable of passing through the slot 5. Alternatively, the wire 2 fed from the nozzle 9 may be inserted into the slot 5 by moving the stator 1 and the upper portion 7 and lower portion guide 8 instead of moving of the nozzle 9 so that the nozzle 9 is moved relative to the opening portions 5a, 5b, 5c (the opening portions 5d, 5e, 5f) of the slot 5.

(3) In the winding method described above, the hold of the upper portion guide 7 on the wire 2 is released immediately after the wire 2 inserted into the slot 5 is led to the winding position on one side face of the winding subject tooth 4 (the state shown in FIG. 4A). However, the hold of the upper portion guide 7 on the wire 2 may be released at any timing between the point immediately after the wire 2 inserted into the slot 5 is led to the winding position on one side face of the winding subject tooth 4 and the point at which the hold of the lower portion guide 8 on the wire 2 is released (between FIG. 4A and FIG. 4F).

(4) A case in which the wire 2 is wound onto an inner stator in which the teeth 4 are disposed radially on the inner periphery of the yoke 3 was described above. However, the stator 1 may be an outer stator in which the teeth 4 are disposed radially on the outer periphery of the yoke 3. In this case, the nozzle moving mechanism 11 is disposed on the outer periphery of the outer stator.

Next, referring to FIG. 5, a case in which the wire 2 is wound obliquely onto the N$^{th}$ layer on the front surface 4a of the winding subject tooth 4 will be described.

Figures 5A, 5B, 5C, 5D, 5E:
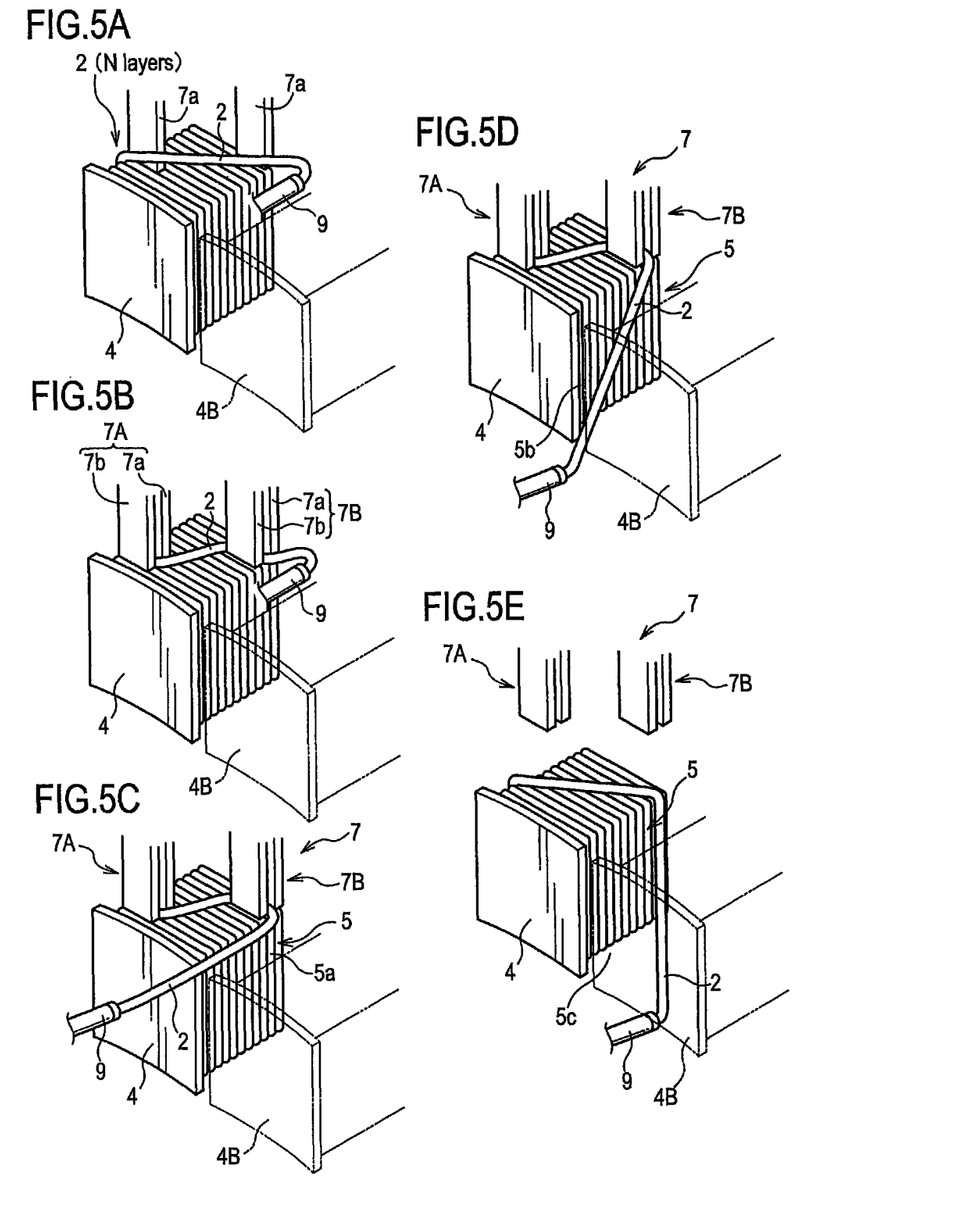
FIGS. 5A to 5E are views showing another winding method in chronological order.

First, as shown in FIG. 5A, the pair of first guides 7a of the upper portion guide 7 are caused to approach the winding subject tooth 4 by driving the guide moving mechanism 12 such that the pair of first guides 7a are disposed at an offset from each other in the winding axis direction (the Y axis direction). The pair of first guides 7a can be moved individually by the respective guide moving mechanisms 12, and can therefore be disposed at an offset from each other in the Y axis direction. Next, the nozzle 9 is moved in the X axis direction and then in the Y axis direction by driving the nozzle moving mechanism 11 such that the wire 2 fed from the nozzle 9 comes into contact with the front surfaces of the pair of first guides 7a. As a result, the wire 2 fed from the nozzle 9 is guided obliquely onto the N$^{th}$ layer on the front surface 4a of the winding subject tooth 4.

Next, as shown in FIG. 5B, the pair of second guides 7b of the upper portion guide 7 are caused to approach the winding subject tooth 4, whereby the wire 2 fed from the nozzle 9 is gripped and held between the opposing surfaces of the pair of first guides 7a and the pair of second guides 7b and positioned obliquely on the N$^{th}$ layer on the front surface 4a of the winding subject tooth 4.

Following positioning by the upper portion guide 7, the nozzle 9 is moved along the opening portions 5a, 5b, 5c of the slot 5 on the outside of the slot 5 in a similar manner to the winding method shown in FIGS. 3 and 4, whereby the fed wire 2 is inserted into the slot 5, as shown in FIGS. 5C to 5E. As a result, the wire 2 fed from the nozzle 9 is led to the winding position on one side face of the winding subject tooth 4 (the surface facing the tooth 4B).

Next, as shown in FIG. 5E, the upper portion guide 7 is withdrawn from the winding subject tooth 4 such that the hold of the upper portion guide 7 on the wire 2 is released. The nozzle 9 is then moved in the X axis direction by driving the nozzle moving mechanism 11, whereby the wire 2 is wound onto the N$^{th}$ layer.

As described above, the upper portion left guide 7A and upper portion right guide 7B of the upper portion guide 7 can be moved individually by the respective guide moving mechanisms 12, and can therefore be disposed at an offset from each other in the Y axis direction. Therefore, the wire 2 can be wound obliquely around the winding subject tooth 4.

FIG. 5 shows a case in which the wire 2 is wound obliquely by causing the nozzle 9 to orbit in a clockwise direction while the upper portion left guide 7A is disposed on the tip end side of the winding subject tooth 4 and the upper portion right guide 7B is disposed on the root side of the winding subject tooth 4.

Figures 6A, 6B, 6C, 6D, 6E:
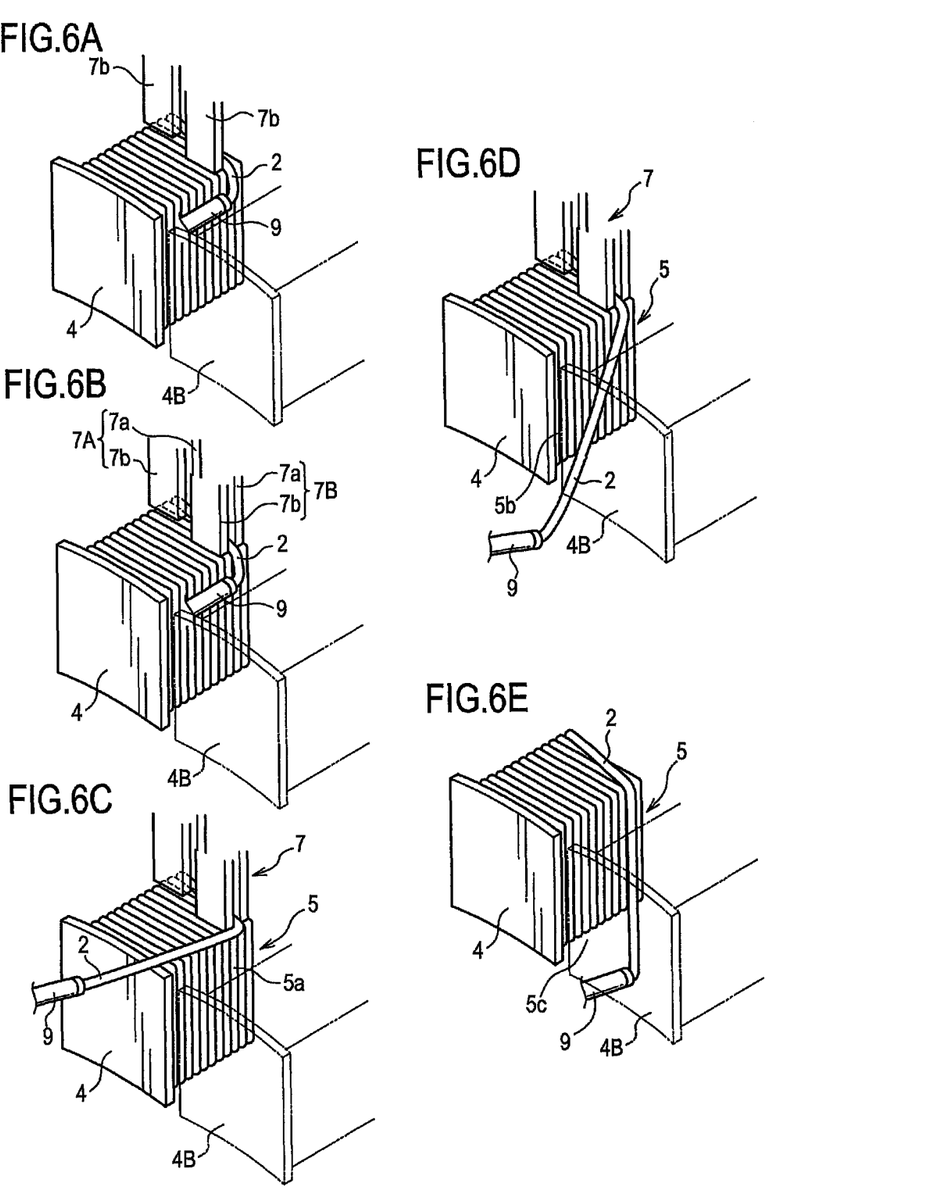
FIGS. 6A to 6E are views showing the other winding method in chronological order.

FIG. 6 shows a case in which the wire 2 is wound obliquely by causing the nozzle 9 to orbit in a clockwise direction while the upper portion left guide 7A is disposed on the root side of the winding subject tooth 4 and the upper portion right guide 7B is disposed on the tip end side of the winding subject tooth 4.

In this case, as shown in FIG. 6, the disposal sequence of the upper portion guide 7 is reversed from that of the case shown in FIG. 5. More specifically, as shown in FIG. 6A, first the pair of second guides 7b are caused to approach the winding subject tooth 4 such that the wire 2 fed from the nozzle 9 comes into contact with the front surface of the pair of second guides 7b. Next, as shown in FIG. 6B, the pair of first guides 7a are caused to approach the winding subject tooth 4 such that the wire 2 fed from the nozzle 9 is held and positioned between the opposing surfaces of the pair of first guides 7a and the pair of second guides 7b.

Thus, when the wire 2 is wound obliquely, the disposal sequence of the upper portion guide 7 is set in accordance with the orientation of the wire 2 and the rotation direction of the nozzle 9.

Next, referring to FIG. 7, the shape of the upper portion guide 7 and the lower portion guide 8 will be described. The upper portion guide 7 and lower portion guide 8 are shaped identically, and therefore only the upper portion guide 7 will be described below.

Figure 7A:
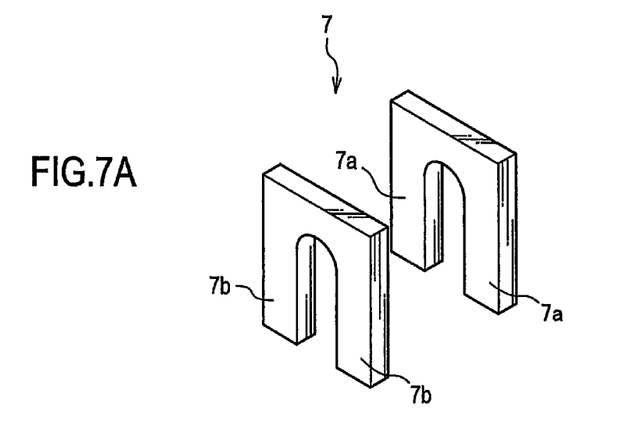
FIGS. 7A to 7C are perspective views showing an upper portion guide.

As shown in FIG. 7A, the pair of first guides 7a and the pair of second guides 7b may each be formed integrally. By constituting the upper portion guide 7 in this manner, the constitution of the guide moving mechanism 12 can be simplified.

Figure 7B:
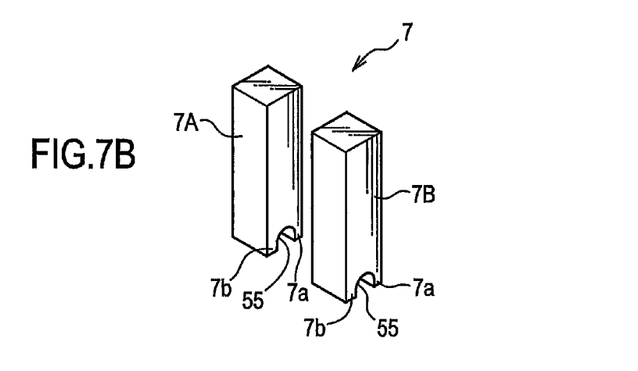

Further, as shown in FIG. 7B, the first guide 7a and second guide 7b of the upper portion left guide 7A and the first guide 7a and second guide 7b of the upper portion right guide 7B may be respectively formed integrally. In this case, a notch portion 55 for holding the wire 2 is formed in the respective bottom surfaces of the upper portion left guide 7A and the upper portion right guide 7B. By constituting the upper portion guide 7 in this manner, the constitution of the guide moving mechanism 12 can be simplified, and since the upper portion left guide 7A and upper portion right guide 7B are formed separately, they can also be used when the wire 2 is wound obliquely.

Figure 7C:
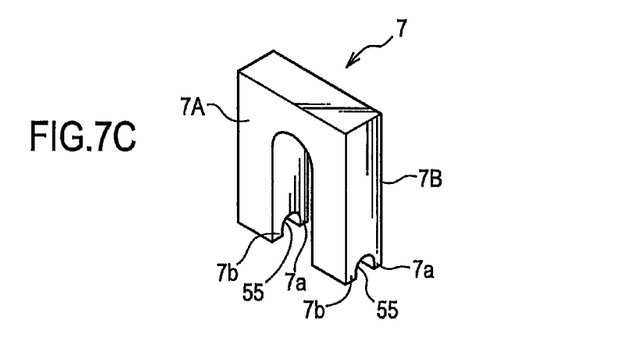

Further, as shown in FIG. 7C, the pair of first guides 7a and the pair of second guides 7b may each be formed integrally, and the upper portion left guide 7A and upper portion right guide 7B may be formed integrally. In this case, the notch portion 55 for holding the wire 2 is formed in the respective bottom surfaces of the upper portion left guide 7A and the upper portion right guide 7B. By constituting the upper portion guide 7 integrally in this manner, the constitution of the guide moving mechanism 12 can be simplified even further.

Next, referring to FIG. 8, a method of winding the wire 2 around the winding subject tooth 4 using the integrated upper portion guide 7 shown in FIG. 7C will be described.

Figure 8A:
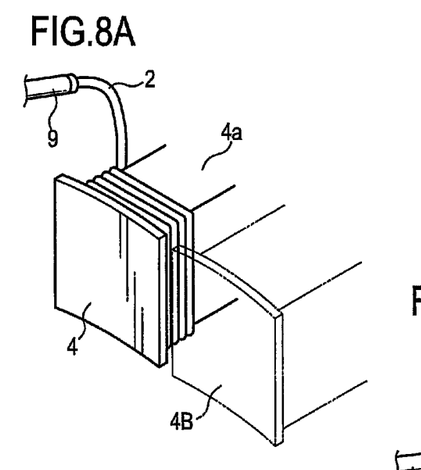
FIGS. 8A to 8E are views showing another winding method in chronological order.

FIG. 8A is a view showing a state immediately before winding of the wire 2 fed from the nozzle 9 around the winding subject tooth 4 begins.

Figure 8B:
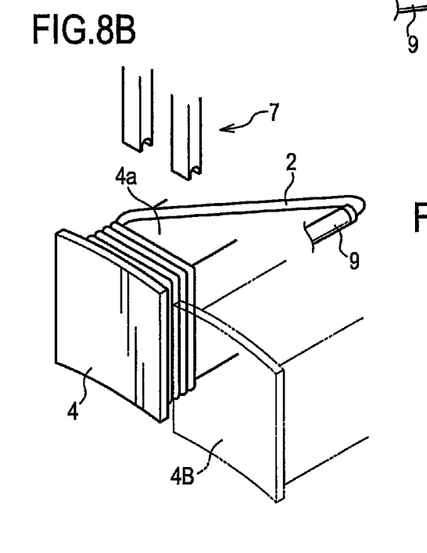

First, as shown in FIG. 8B, the nozzle 9 positioned on the outside of the slot 9 is moved away from the winding subject tooth 4 in the X axis direction by driving the nozzle moving mechanism 11. In so doing, the wire 2 is drawn out from the nozzle 9. The length of the wire 2 drawn out from the nozzle 9 is set to be longer than in the winding method using the divided upper portion guide 7 (the state shown in FIG. 3B).

Figure 8C:
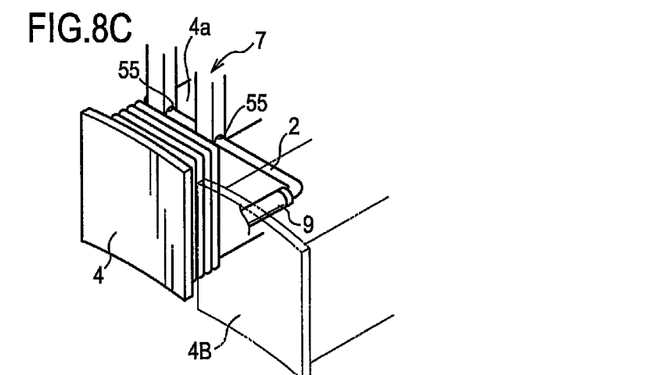

Next, as shown in FIG. 8C, the nozzle 9 is moved in the Z axis direction by driving the nozzle moving mechanism 11 such that the wire 2 drawn out from the nozzle 9 is trained into the winding position on the front surface 4a of the winding subject tooth 4. Further, the upper portion guide 7 is caused to approach the winding subject tooth 4 by driving the guide moving mechanism 12 such that the wire 2 trained onto the front surface 4a is held by the notch portions 55.

Thus, when winding is performed using the integral upper portion guide 7, the wire 2 is drawn out from the nozzle 9 and held by the upper portion guide 7 after being trained onto the winding subject tooth 4. In other words, the wire 2 fed from the nozzle 9 is positioned by the upper portion guide 7 after being wound into the winding position on the front surface 4a of the winding subject tooth 4.

Figure 8D:
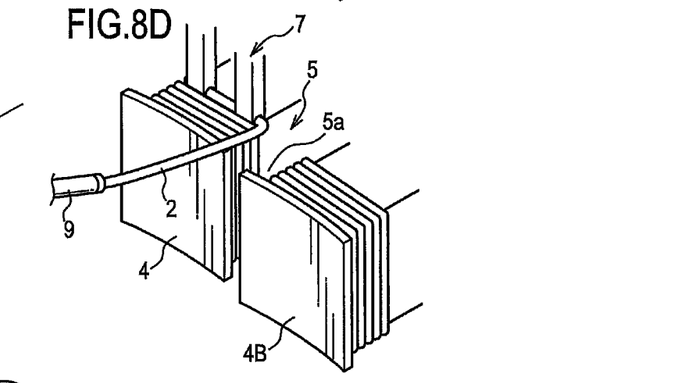
Figure 8E:
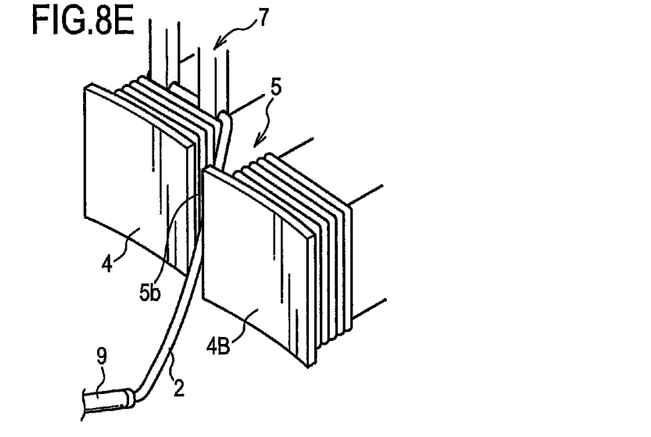

Subsequent procedures shown in FIGS. 8D and 8E are similar to their counterparts in the winding method described above.

According to the first embodiment described above, the following effects are obtained.

When the gap between adjacent teeth 4, or in other words the width W of the slot 5, becomes smaller than the width of the nozzle 9 such that the nozzle 9 becomes unable to pass through the slot 5, the nozzle 9 is moved without being passed through the slot 5 such that the fed wire 2 is inserted into the slot 5. During this movement of the nozzle 9, the wire 2 is positioned and held in the winding position by the upper portion guide 7 and lower portion guide 8. Hence, even when the nozzle 9 cannot pass through the slot 5, the wire 2 fed from the nozzle 9 is led to and wound regularly around the tooth 4. Further, in the winding method used by the winding device 100, the wire 2 can be wound directly around each tooth 4 of the stator 1, and therefore the stator 1 can be produced efficiently without the need for post-processing following the winding.

Second Embodiment

Figure 9:
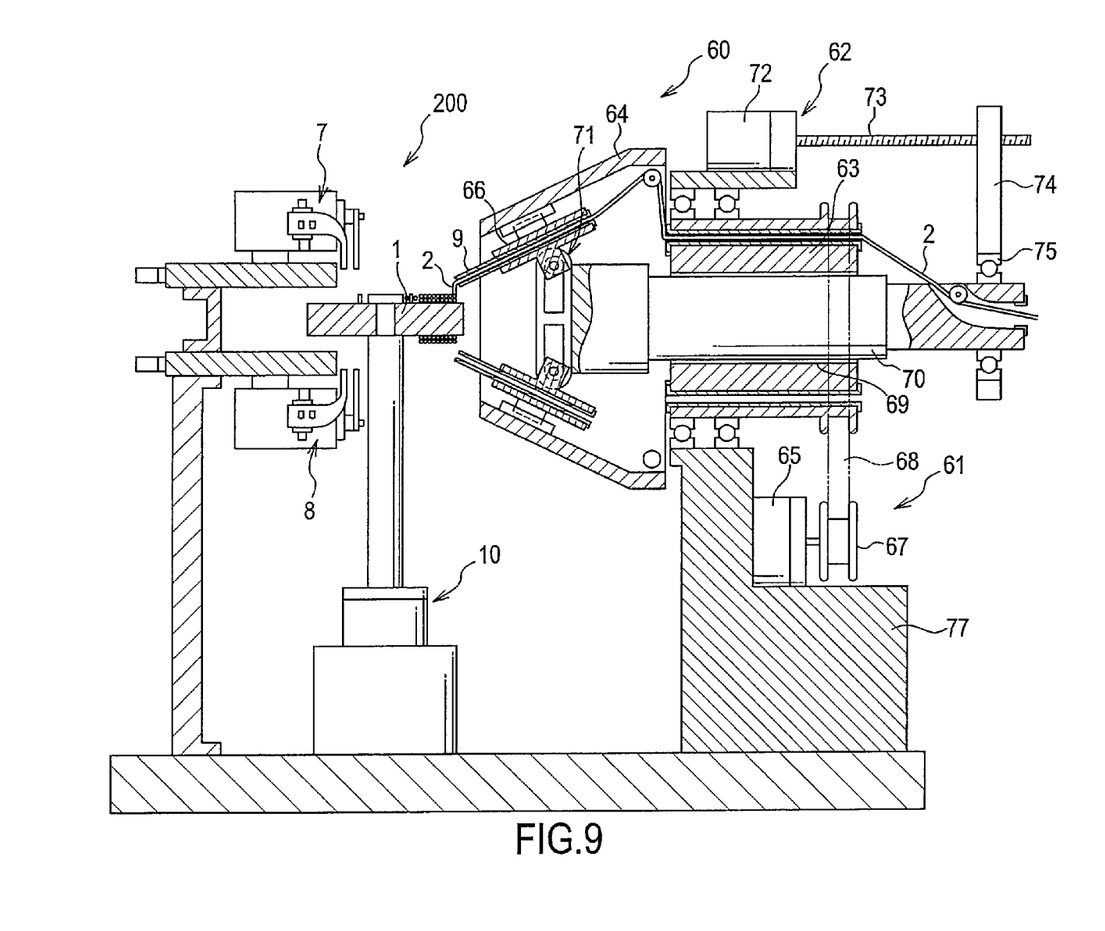
FIG. 9 is a sectional view showing a winding device according to a second embodiment of this invention.

Referring to FIG. 9, a winding device 200 according to a second embodiment of this invention will be described. FIG. 9 is a sectional view showing the winding device 200.

In the following description, identical reference symbols to those used in the first embodiment denote identical members to the members described in the first embodiment, and description of these members has been omitted.

The second embodiment differs from the first embodiment in the constitution of the nozzle moving mechanism that moves the nozzle 9. A nozzle moving mechanism 60 serving as a wire feeding member moving mechanism of the winding device 200 will be described below.

The nozzle moving mechanism 11 of the winding device 100 according to the first embodiment moves the nozzle 9 in the three orthogonal axis directions such that the wire 2 is wound around the winding subject tooth 4. In contrast, the nozzle moving mechanism 60 comprises a nozzle rotating mechanism 61 that rotates the nozzle 9 about the winding axis of the winding subject tooth 4 and an axial direction moving mechanism 62 that moves the nozzle 9 in the winding axis direction of the winding subject tooth 4, and the wire 2 is wound around the winding subject tooth 4 by these two mechanisms.

The nozzle rotating mechanism 61 comprises a cylindrical spindle 63 disposed coaxially with the winding axis of the winding subject tooth 4, a flyer 64 coupled to an end portion of the spindle 63, and a spindle motor 65 that rotates the spindle 63 about its axial center. The nozzle 9 is supported on an inner peripheral surface of the flyer 64 via a nozzle support member 66.

An output shaft of the spindle motor 65 is connected to the spindle 63 via a pulley 67 and a belt 68. Hence, when the spindle motor 65 is driven, the nozzle 9 rotates about the winding axis of the winding subject tooth 4.

The axial direction moving mechanism 62 comprises a sliding shaft 70 supported on the inner peripheral surface of the spindle 63 so as to be free to slide via a spline 69, a nozzle driving portion 71 provided on an end portion of the sliding shaft 70 so as to transmit the movement of the sliding shaft 70 to the nozzle 9, and an axial direction moving motor 72 that moves the sliding shaft 70 in the winding axis direction of the winding subject tooth 4.

A ball screw 73 is coupled to an output shaft of the axial direction moving motor 72, and a follower 74 screwed to the ball screw 73 is connected to the sliding shaft 70 via a bearing 75. Hence, when the axial direction moving motor 72 is driven, the sliding shaft 70 moves in the winding axis direction of the winding subject tooth 4. Thus, due to the action of the nozzle driving portion 71, the nozzle 9 moves along the inner peripheral surface of the flyer 64 in the winding axis direction of the winding subject tooth 4.

When winding is performed using the nozzle moving mechanism 60, first the nozzle 9 is caused to orbit the winding subject tooth 4 by driving the nozzle rotating mechanism 61. The axial direction moving mechanism 62 is driven every time the nozzle 9 completes a single orbit to move the nozzle 9 by an amount corresponding to the diameter of the wire 2 in the winding axis direction of the winding subject tooth 4, and thus, winding is performed.

When the width W of the slot 5 decreases such that the nozzle 9 can no longer pass through the slot 5, winding is performed using the upper portion guide 7 and the lower portion guide 8.

More specifically, the movement of the nozzle 9 shown in FIGS. 3B, 3E, 4B and 4E in the winding method of the first embodiment shown in FIGS. 3 and 4 is performed by driving the nozzle rotating mechanism 61, while the movement of the nozzle 9 in the winding axis direction of the winding subject tooth, shown in FIGS. 3D, 4A, 4D and 4F, is performed by driving the axial direction moving mechanism 62.

Hence, likewise in the second embodiment, winding can be continued when the width W of the slot 5 decreases such that the nozzle 9 can no longer pass through the slot 5.

It should be noted, however, that when winding is performed using the nozzle moving mechanism 60, the nozzle 9 is moved in a circular trajectory by the nozzle rotating mechanism 61, and cannot therefore pass through the slot 5 in a straight line. Therefore, the width W of the slot 5 at which the nozzle 9 becomes unable to pass through the slot 5 is larger than that of the winding method according to the first embodiment, leading to an increase in the time required to perform winding using the upper portion guide 7 and lower portion guide 8.

Hence, to enable the nozzle 9 to pass through the slot 5 in a straight line, a mechanism that moves the spindle 63 in the axial direction of the stator 1, or in other words a mechanism that moves a base 77 supporting the entire nozzle moving mechanism 60 in the axial direction of the stator 1, may be provided. With this constitution, the time required to perform winding using the upper portion guide 7 and lower portion guide 8 is reduced, leading to an improvement in operating efficiency. It should be noted that a mechanism for moving the stator 1 in the axial direction may be provided in place of the mechanism for moving the base 77 in the axial direction of the stator 1.

This invention is not limited to the embodiments described above, and may be subjected to various modifications within the scope of the technical spirit thereof.

What is claimed is:

1. A winding device for winding a wire onto a stator having a plurality of radially disposed magnetic poles including adjacent magnetic poles that include a winding subject magnetic pole and another magnetic pole, the winding device comprising:
   a wire feeding member for feeding the wire;
   a wire feeding member moving mechanism for moving the wire feeding member relative to the stator; and
   a guide for holding the wire fed from the wire feeding member and for positioning the fed wire relative to the winding subject magnetic pole, the guide being configured to face a non-opposing surface, which does not oppose the another magnetic pole, of an outer peripheral surface of the winding subject magnetic pole,
   wherein the wire feeding member is configured to be moved relative to the stator without being passed between the adjacent magnetic poles while the fed wire is being held by the guide such that the fed wire is inserted between the adjacent magnetic poles, and
   wherein the guide is configured to be moved in a winding axis direction of the winding subject magnetic pole by an amount corresponding to a diameter of the fed wire every time the fed wire is wound once around the winding subject magnetic pole so that the fed wire is wound regularly around the winding subject magnetic pole,
   the guide including
      a first guide configured to be disposed parallel to a winding direction of the wire wound around the winding subject magnetic pole, and
      a second guide configured to be disposed at a gap corresponding to the diameter of the wire from the first guide,
      wherein the first guide and the second guide are configured to be positioned so that the fed wire is held therebetween,
   further wherein the first guide and the second guide are configured to move relative to each other so as to hold the fed wire.

2. The winding device as defined in claim 1, where into guide the wire fed from the wire feeding member between the adjacent magnetic poles, the wire feeding member is configured to be moved relative to an opening portion in a slot formed between the adjacent magnetic poles while the fed wire is held by the guide.

3. The winding device as defined in claim 1, wherein the guide comprises a pair of the first guide and a pair of the second guide are configured to face the non-opposing surface.

4. The winding device as defined in claim 1,
   wherein the first guide is configured to face the winding subject magnetic pole,
   the first and second guides are configured to be positioned relative to the wire feeding member so that the fed wire contacts the first guide such that the fed wire is guided onto the magnetic pole, and
   the second guide is configured to approach the winding subject magnetic pole such that the fed wire is held between the first guide and the second guide and the held wire is positioned relative to the winding subject magnetic pole.

* * * * *